(12) United States Patent
Sugimoto et al.

(10) Patent No.: US 8,353,527 B2
(45) Date of Patent: Jan. 15, 2013

(54) AIRBAG DEVICE

(75) Inventors: Daisuke Sugimoto, Minato-ku (JP);
Kenji Nakamura, Minato-ku (JP)

(73) Assignee: Takata Corporation, Tokyo (JP)

( * ) Notice: Subject to any disclaimer, the term of this patent is extended or adjusted under 35 U.S.C. 154(b) by 465 days.

(21) Appl. No.: 12/451,788

(22) PCT Filed: May 23, 2008

(86) PCT No.: PCT/JP2008/059575
§ 371 (c)(1),
(2), (4) Date: Dec. 1, 2009

(87) PCT Pub. No.: WO2008/152901
PCT Pub. Date: Dec. 18, 2008

(65) Prior Publication Data
US 2010/0194083 A1    Aug. 5, 2010

(30) Foreign Application Priority Data

Jun. 11, 2007  (JP) ................ 2007-154327

(51) Int. Cl.
*B60R 21/2338* (2011.01)
*B60R 21/207* (2006.01)
(52) U.S. Cl. ................ 280/730.2; 280/743.2
(58) Field of Classification Search ........... 280/730.2, 280/743.2
See application file for complete search history.

(56) References Cited

U.S. PATENT DOCUMENTS

| | | | |
|---|---|---|---|
| 5,556,128 A * | 9/1996 | Sinnhuber et al. | 280/730.2 |
| 6,478,329 B1 * | 11/2002 | Yokoyama | 280/729 |
| 7,549,672 B2 | 6/2009 | Sato et al. | |
| 2006/0038386 A1 | 2/2006 | Shibayama et al. | |
| 2007/0096444 A1 * | 5/2007 | Bostrom et al. | 280/730.2 |

FOREIGN PATENT DOCUMENTS

| | | |
|---|---|---|
| JP | H04-046837 | 2/1992 |
| JP | U-H05-3055 | 1/1993 |
| JP | 05-208647 | 8/1993 |
| JP | H05-208647 | 8/1993 |
| JP | H07-267037 | 10/1995 |
| JP | 2001-080445 | 3/2001 |
| JP | 2005-306377 | 11/2005 |
| JP | 2006-008105 A | 1/2006 |
| JP | 2006-35988 A | 2/2006 |
| JP | 2006-524161 | 10/2006 |
| WO | WO 01/49535 A1 | 7/2001 |

OTHER PUBLICATIONS

Japan Patent Office, Office Action for 2007-154327, Sep. 18, 2012.

* cited by examiner

*Primary Examiner* — Joseph Rocca
*Assistant Examiner* — Keith Frisby
(74) *Attorney, Agent, or Firm* — Manabu Kanesaka

(57) ABSTRACT

In an airbag device of the present invention, in an inner portion in a car width direction of at least one of adjacent two seats in a vehicle, a central airbag (4) is housed which is connected to a side face (200) of a seat frame (20) of the seat through a predetermined connecting member. On an outer face inside in the car width direction of the central airbag (4), a plurality of tethers (41), . . . are provided. This central airbag (4) counteracts a force from inside in the car width direction with tensions of the tethers (41), . . . and counteracts a force from outside in the car width direction with a force received from the side face (200) of the seat frame in inflation and extension.

6 Claims, 5 Drawing Sheets

AIRBAG DEVICE

TECHNICAL FIELD

The present invention relates to an airbag device mounted on a vehicle. The present invention particularly relates to a side airbag device regulating movement of an occupant inward in a car width direction at a side collision.

BACKGROUND ART

As an airbag device mounted on a vehicle such as an automobile, a driver airbag device and a passenger airbag device regulating movement of an occupant in a vehicle traveling direction and easing an impact applied to the occupant at a front collision of a vehicle are well known.

Recently, an airbag device intended to protect an occupant at a side collision (side airbag device) has been developed in addition to the above airbag devices. This type of side airbag device includes, for example, an airbag device of a type in which an airbag provided at a seat or a side door is inflated and extended at a side collision. Alternatively, for example, there is a side airbag device of a type in which an airbag provided between a roof side rail and a ceiling member is inflated and extended downward in a curtain state.

In a side collision, an occupant on a seat on a non-collision side receives a force toward a direction on a collision side (that is, inward in the car width direction). Then, the occupant is moved inward in the car width direction. Without means for regulating the movement inward in the car width direction, there is a fear that the occupant might be injured by a collision against the other seat or the like. Also, if occupants are seated on each of the adjacent seats, respectively, there is a fear that the both occupants might collide against each other.

Patent Document 1 discloses a technique to avoid a collision between occupants by inflating and extending an airbag between both seats and pushing out the both occupants outward in the car width direction, respectively, at a vehicle collision.

In the technique disclosed in Patent Document 1, a switch operation portion protruding from a center part of an instrument panel to rear of a vehicle is provided, and an airbag is provided below the switch operation portion. Since the airbag is partially brought into contact with a lower face of the switch operation portion above when it is inflated, upward inflation of the airbag is regulated. Then, the airbag is inflated outward to the right and left or rearward. Thus, right and left occupants are pushed outward, respectively.

[Patent Document 1] Japanese Patent No. 2800486

DISCLOSURE OF INVENTION

Problems to be Solved by the Invention

However, with the technique disclosed in Patent Document 1, a portion protruding from the center part of the instrument panel to the rear of the vehicle needs to be provided. Therefore, a living space of front seats is narrowed and a design in a vehicle interior is also limited.

The present invention was made in view of the above circumstances and has an object to provide an airbag device regulating movement of an occupant inward in the car width direction at a side collision. Also, the present invention has an object to provide an airbag device which is easily mounted on a vehicle and has general versatility.

Means for Solving the Problems

In order to achieve the above object, an airbag device according to a first viewpoint of the present invention is provided with side-collision detecting means for detecting a side collision of a vehicle, a central airbag housed in an inner portion in a car width direction of at least one of two adjacent seats in the vehicle and connected to a side face of a seat frame of the seat through a connecting member, a tether provided on an outer face inside in the car width direction of the central airbag, and an inflator housed in the seat containing the central airbag and supplying a gas into the central airbag at a side collision of the vehicle, in which the central airbag counteracts a force from inside in the car width direction by a tension of the tether and counteracts a force from outside in the car width direction by a force received from the side face of the seat frame during inflation and extension.

Also, a plate to be brought into planar contact with a base-end side curved face of the central airbag when receiving a force from the outside in the car width direction may be provided between the seat frame and the central airbag.

Also, on the plate, a pressure sensor may be provided at a position of the planar contact with the base-end side curved face of the central airbag so that the pressure sensor detects a pressure received from the central airbag, and plate control means for displacing the plate according to a pressure detected by the pressure sensor may be further provided.

Also, the plate may be installed between the seat frame and the tether, and the plate, the seat frame and the tether are connected through a predetermined connecting member, while the plate control means may rotate the plate around the connecting member according to the pressure detected by the pressure sensor.

In the airbag device with each of the above configurations, from the viewpoint of easing an impact caused by a collision between an occupant and a car body (a door, a pillar and the like), a door-side airbag may be further provided which is housed in a side face portion on a vehicle door side of each of the both seats and is inflated and extended at a side collision of the vehicle.

Also, an airbag device according to a second viewpoint of the present invention is provided with side-collision detecting means for detecting a side collision of a vehicle, a central airbag housed in an inner portion in a car width direction of at least one of two adjacent seats in the vehicle and connected to a seat frame of the seat through a predetermined connecting member, and an inflator housed in the seat containing the central airbag and supplying a gas into the central airbag at a side collision of the vehicle, in which the central airbag is connected to the seat frame through a first connection point and a second connection point located on a base end side of the central airbag from the first connection point, and the central airbag counteracts a force from inside in the car width direction by a connecting force with the seat frame at the second connection point and counteracts a force from outside in the car width direction by the connecting force with the seat frame at the first connection point during inflation and extension.

In this case, regardless of the direction of the side collision, both the door-side airbags may be inflated and extended or only the door-side airbag corresponding to a direction of the side collision may be inflated and extended.

Advantages

According to the present invention, the central airbag housed in at least one of the adjacent two seats is inflated and extended against a force from either of inside or outside in the car width direction caused by movement of an occupant at a side collision of the vehicle. Therefore, the central airbag can effectively regulate the movement of the occupant inward in the car width direction.

Figure 1:
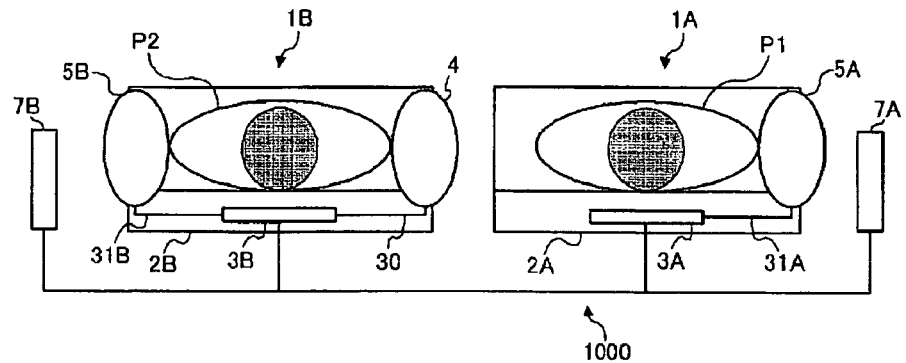
FIG. 1 is a plan view illustrating a state in which an airbag has been inflated and extended in an airbag device according to a first embodiment of the present invention.

| Reference Numerals | |
|---|---|
| 1A, 1B | seat |
| 2A, 2B | seat back |
| 20 | seat frame |
| 3A, 3B | inflator |
| 30, 31A, 31B | gas supply pipe |
| 4 | central airbag |
| 410 | tab |
| 5A, 5B | door-side airbag |
| 6 | retainer |
| 7A, 7B | side-collision detection sensor |
| 23 | plate |
| 21, 22, 25, 26, 27, 28 | bolt |
| 40, 41, 45, 47 | tether |
| 50 | pressure sensor |
| 51 | plate control portion |
| 400, 405, 406, 407 | lug portion |
| 1000 | airbag device |
| P1, P2 | occupant |

BEST MODE(S) FOR CARRYING OUT THE INVENTION

An embodiment of an airbag device according to the present invention will be described below referring to the attached drawings.

First Embodiment

Figure 2:
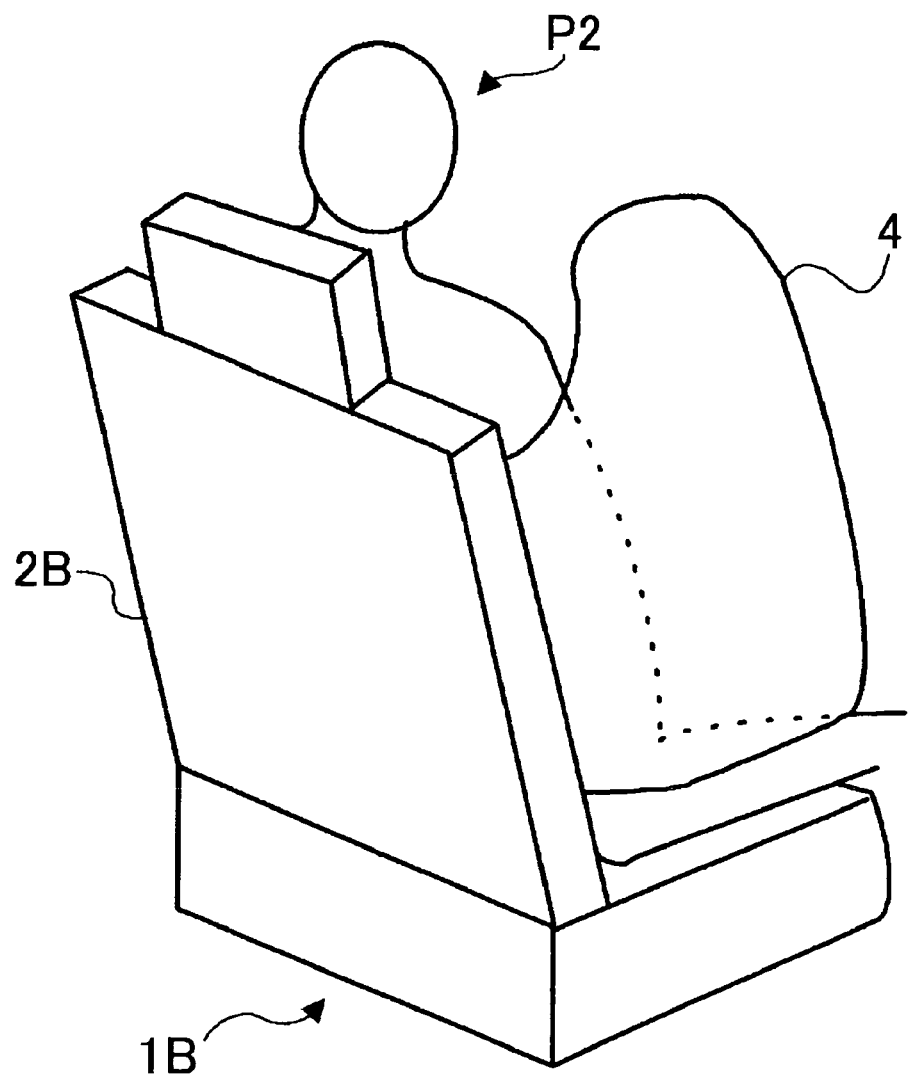
FIG. 2 is a perspective view illustrating an inflated and extended state of a central airbag in the state in FIG. 1.

FIG. 1 is a plan view illustrating a state in which an airbag (a central airbag 4, door-side airbags 5A and 5B) of an airbag device according to a first embodiment of the present invention is inflated and extended. FIG. 2 is a perspective view illustrating an inflated and extended state of the central airbag 4. In FIG. 1, seats 1A and 1B constitute front seats of a vehicle. For example, the seat 1A is a driver seat and the seat 1B is a passenger seat.

The central airbag 4 is inflated and extended to a size that can cover a side portion from an abdomen portion to a head portion of an occupant P2 at a side collision of the vehicle as shown in FIG. 2. The central airbag 4 is folded and housed in a side portion inside in a car width direction (center side in the vehicle) of a seat back 2B of the seat 1B.

The door-side airbag 5A (5B) is inflated and extended to a size that can cover a side portion from an abdomen portion to a head portion of an occupant P1 (P2) at a side collision of the vehicle similarly to the central airbag 4. Therefore, the door-side airbag 5A (5B) eases an impact received by the occupant P1 (P2) by a collision between the occupant P1 (P2) and a car body (door, a pillar and the like). The door-side airbag 5A (5B) is usually housed in a side face portion on a vehicle door side of the seat back 2A (2B) of the seat 1A (1B).

As shown in FIG. 1, in the seat backs 2A and 2B, inflators 3A and 3B, which are gas supply devices for inflating the airbags, are housed. The inflators 3A and 3B inject a gas (inactive gas such as argon gas or the like) when side-collision detection sensors 7A and 7B detect a side collision.

The gas injected by the inflator 3A is supplied to the door-side airbag 5A through a gas supply pipe 31A. On the other hand, the inflator 3B has gas injection ports on both ends thereof. The inflator 3B supplies a gas to the central airbag 4 and the door-side airbag 5B substantially at the same time through the gas supply pipes 30 and 31B, respectively.

The central airbag 4 can also counteract a force applied from either of outside or inside in the car width direction in the inflated and extended state. Therefore, the central airbag 4 can effectively regulate the movement of the occupant P1 (P2) toward the vehicle center side.

Figure 3:
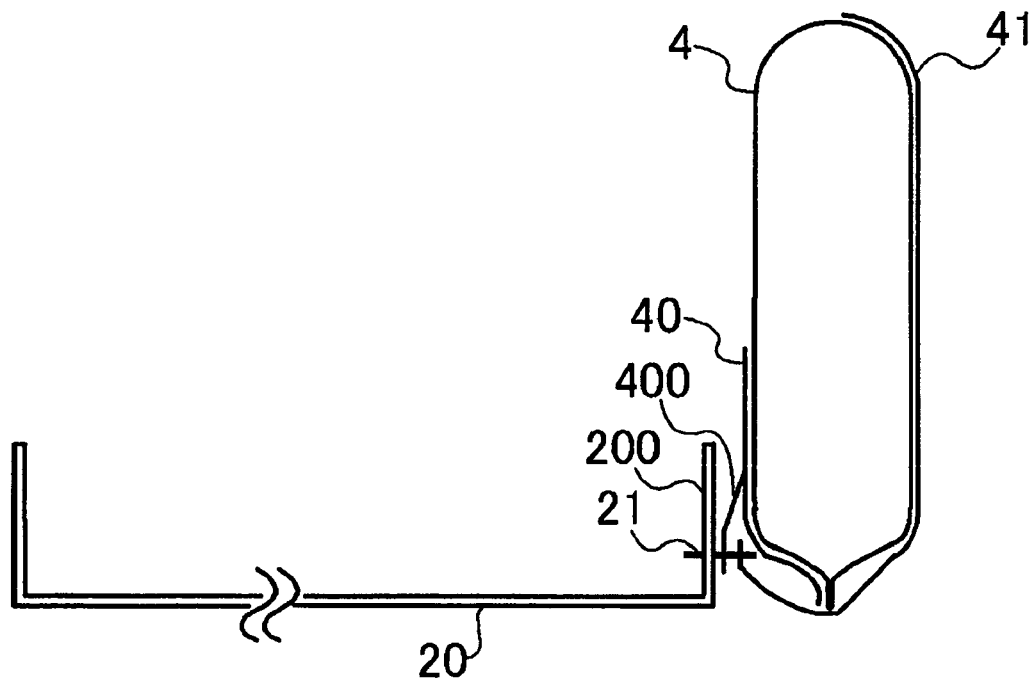
FIG. 3 is a plan view illustrating the inflated and extended state of the central airbag in FIG. 1.

A mechanism for inflating and extending the central airbag 4 as above will be explained referring to FIG. 3. FIG. 3 is a plan view of an essential part illustrating an inflated and extended state of the central airbag 4.

As shown in FIG. 3, on an outer face on the side opposing the side face (seat frame side face 200) inside in the car width direction of a seat frame 20 of the central airbag 4, a plurality of (two, for example) strip-shaped tethers 40 for fixing the central airbag 4 to the seat frame 20 are disposed. On the tethers 40, . . . , lug portions 400 whose one parts are sewn in a lug shape are provided.

On the seat frame side face 200, a plurality of (two, for example) bolts 21, . . . are fixed vertically. The lug portions 400, . . . are connected to the bolts 21 . . . . The shape of the tether 40 may be a band. In that case, the number of tethers 40 disposed may be one.

Also, on the outer face inside in the car width direction of the central airbag 4, a plurality of (two, for example) strip-shaped tethers 41 are disposed. One of end portions of the tethers 41, is sewn into the distal end portion of the central airbag 4, while the other end portion is mounted to the bolt 21, fixed to the seat frame 20. On a disposition path, predetermined portions of the tethers 41, . . . may be sewn into the surface of the central airbag 4.

A length of the tethers 41, . . . is shorter than a length of a path (hereinafter referred to as a bag length) from the distal end portion of the central airbag 4 to the bolts 21, . . . through the outer face in the case of maximum inflation without disposing the tethers 41, . . . . Then, when the central airbag 4 is inflated and extended, extension in the outer face inside in the car width direction of the central airbag 4 is suppressed by tension of the tethers 41, .... As a result, a force to pull the central airbag 4 toward the vehicle center side is generated. That is, a force acts in a direction to cancel the force applied from inside in the car width direction (vehicle center side). The shape of the tether 41 may be a band, and in that case, the number of the tethers 41 disposed may be one.

Figure 4:
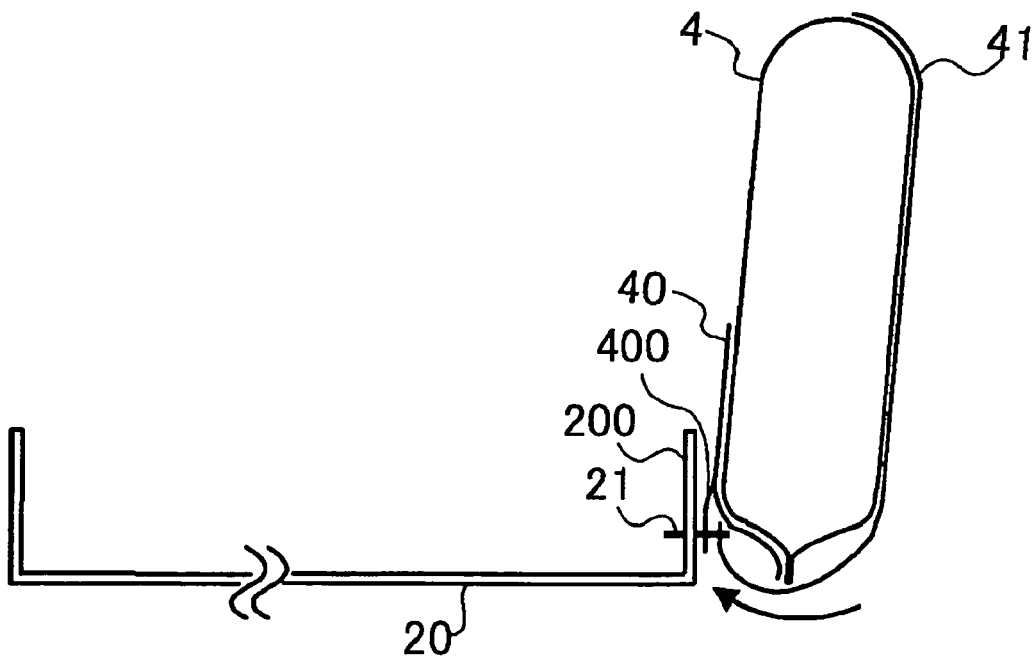
FIG. 4 is a plan view illustrating a state in which a force from outside in a car width direction is applied to the central airbag in FIG. 3.

On the other hand, if a force is applied from outside in the car width direction, using a connection point (connection point between the lug portion 400 and the bolts 21, ... ) between the central airbag 4 and the seat frame 20 as a fulcrum, a base end side (that is, the side not to be extended) of the central airbag 4 is rotated outward in the car width direction (See FIG. 4). However, since the base end side of the central airbag 4 is brought into contact with the seat frame side face 200, the rotation of the central airbag is prevented. That is, the force received from the seat frame 20 becomes a drag against the force from outside in the car width direction.

In this way, the central airbag 4 can be brought into a state in which the force applied from either of outside or inside in the car width direction can be counteracted in inflation and extension. As a result, the movement of the occupant P1 (P2) to the vehicle center side at the side collision of the vehicle can be effectively regulated.

The central airbag 4 may be connected to the seat frame 20 not through the tethers 40, ... but through a metal or resin plate.

Figure 5:
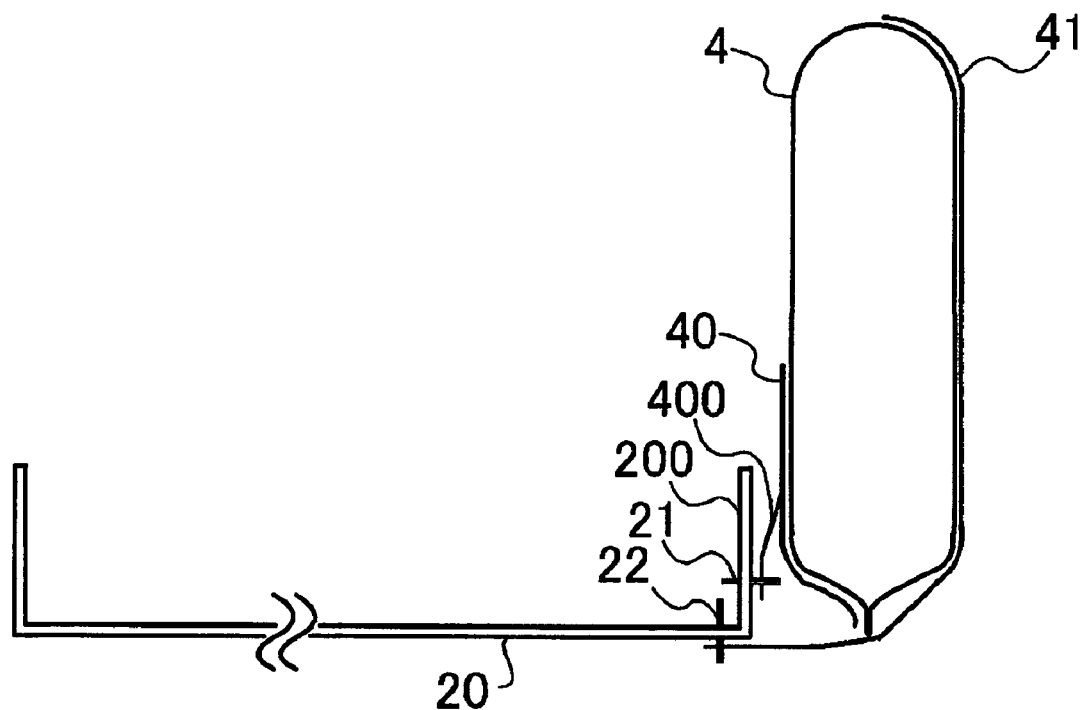
FIG. 5 is a plan view illustrating a variation (No. 1) of the first embodiment.

Also, the connection point between the tethers 41, ... and the seat frame 20 may be different from the connection point between the tethers 40, ... and the seat frame 20. For example, as shown in FIG. 5, the end portions of the tethers 41, ... may be connected to a plurality of (two, for example) bolts 22, ... fixed to the back face inside in the car width direction of the seat frame 20.

Figure 6:
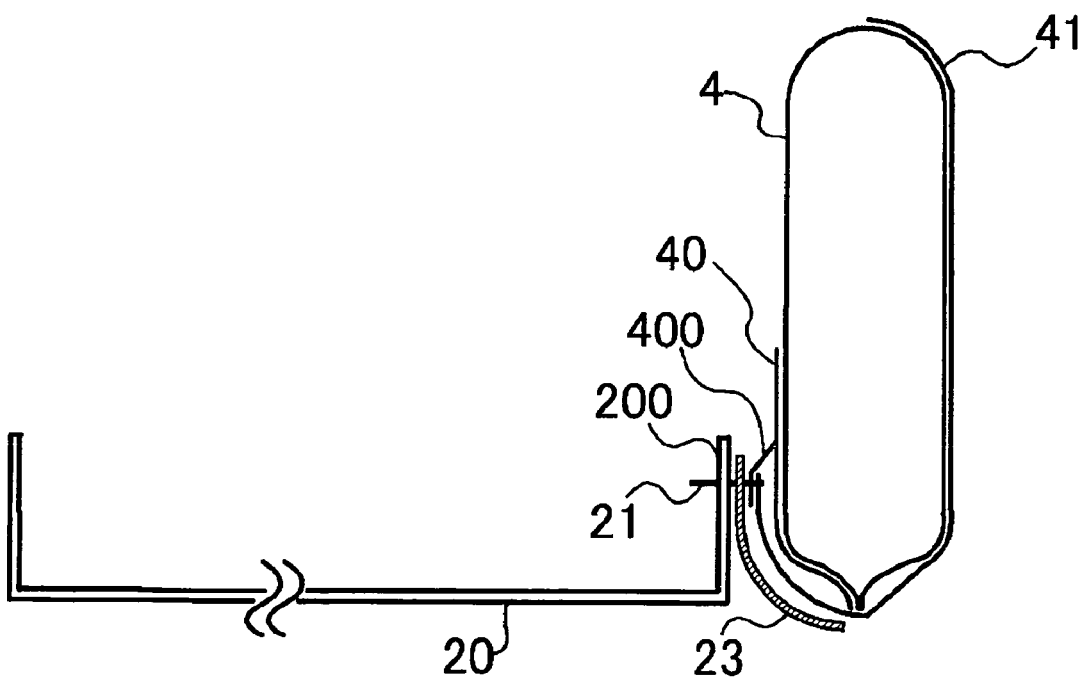
FIG. 6 is a plan view illustrating a variation (No. 2) of the first embodiment.

Also, in order to generate the drag against the force applied from outside in the car width direction more effectively, as shown in FIG. 6, it may be so configured that an arc-shaped plate 23 on plan view is interposed between the seat frame 20 and the central airbag 4. With such a configuration, since the base end side (in the curved face state) of the central airbag 4 is in contact with the plate 23 in a wide range, the central airbag 4 can cancel the force applied from the outside in the car width direction more effectively.

Figure 7:
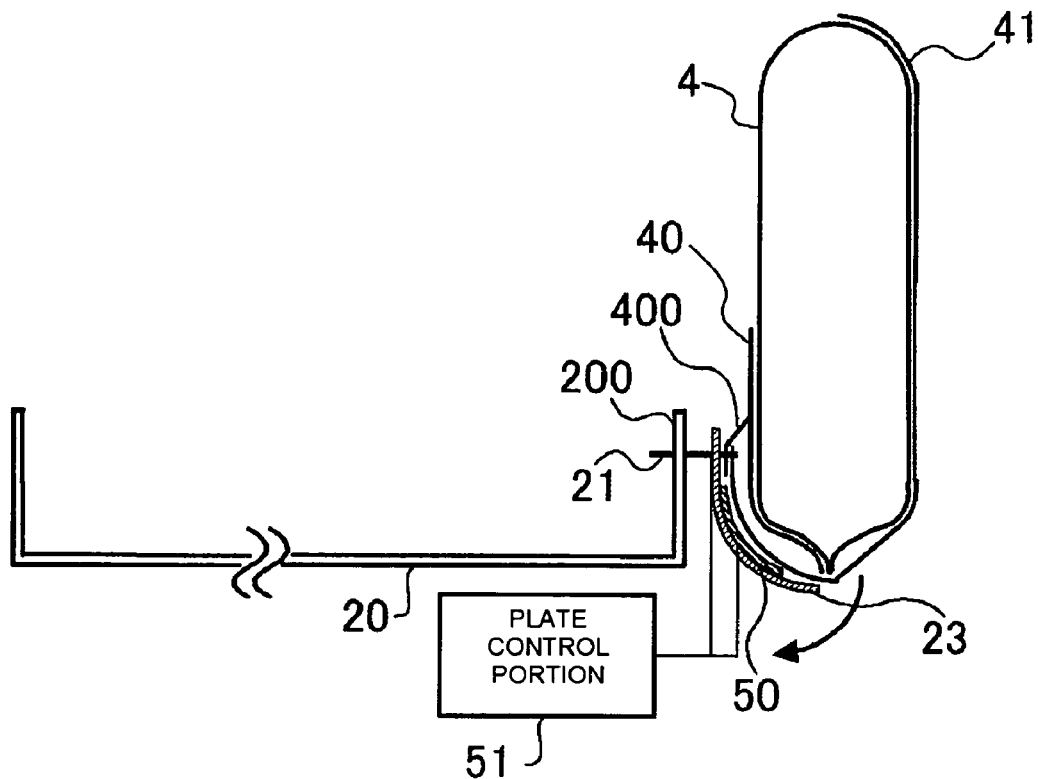
FIG. 7 is a plan view illustrating a variation (No. 3) of the first embodiment.

Also, the drag against the force applied from outside in the car width direction may be generated in a stepped manner. In this case, as shown in FIG. 7, a pressure sensor 50 is provided on a face of the plate 23 in contact with the central airbag 4. Then, a plate control portion 51 for rotating the plate 23 around the bolt 21 according to a pressure detected by the pressure sensor 50 is provided. For example, the plate control portion 51 rotates the plate 23 by a first angle if the pressure sensor detects a first pressure and rotates the plate 23 up to a second angle larger than the first angle if a second pressure larger than the first pressure is detected.

As mentioned above, since the plate 23 is rotated in a stepped manner, the central airbag 4 is also rotated in a stepped manner. Thus, the central airbag 4 can further ease the impact applied on the occupant while regulating the movement of the occupant.

Second Embodiment

Subsequently, an airbag device according to a second embodiment of the present invention will be described. The airbag device according to this embodiment inflates and extends the central airbag 4 in a state in which a force applied from either of outside or inside in the car width direction can be counteracted by a method different from that of the airbag device according to the first embodiment. The same points as those of the airbag device according to the first embodiment will be given the same reference numerals in the attached drawings and the description will be omitted.

Figure 8:
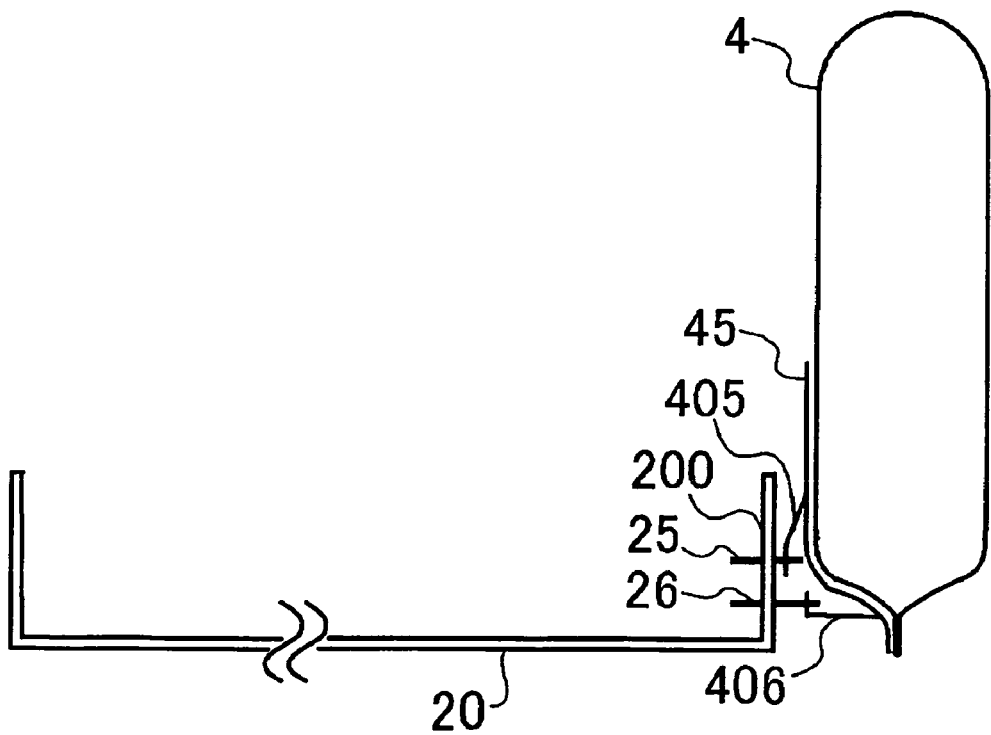
FIG. 8 is a plan view illustrating an inflated and extended state of a central airbag in an airbag device according to a second embodiment of the present invention.

FIG. 8 is a plan view of an essential part illustrating an inflated and extended state of the central airbag 4 according to this embodiment. As shown in FIG. 8, on the outer face on the side opposing the seat frame side face 200 of the central airbag 4, a plurality of (two, for example) strip-shaped tethers 45 are disposed. On the tethers 45, ..., two lug portions 405, 406 whose one parts are sewn into lug shapes are provided separately by a predetermined interval. The shape of the tether 45 may be a band. Also, the number of tethers 45 disposed may be one.

On the seat frame side face 200, a plurality of (two each in the vertical and horizontal directions, totaling in four, for example) bolts are fixed. And the lug portions 405, ... are connected to two bolts 25, ... on the vehicle traveling side (in other words, the vehicle front side). Also, the lug portions 406, ... are connected to two bolts 26, ... on the vehicle rear side.

As mentioned above, if a force is applied from inside in the car width direction (vehicle center side) in inflation and extension, a connection point (first connection point) between the lug portion 405 and the bolts 25, ... becomes a fulcrum. Then, the base end side of the central airbag 4 is rotated to the inside in the car width direction. Therefore, the rotation is prevented by a connecting force of a connection point (second point) between the lug portion 406 and the bolts 26, .... That is, the connecting force at the second connection point becomes a drag against the force from inside in the car width direction.

On the other hand, if a force is applied from outside in the car width direction, the second connection point becomes the fulcrum. Then, the distal end side (that is, the extension side) of the central airbag 4 is rotated to the inside in the car width direction. However, the rotation is prevented by the connecting force at the first connection point. That is, the connecting force at the first connection point becomes a drag against the force from outside in the car width direction.

As mentioned above, in the airbag device of this embodiment, too, the central airbag 4 can be brought into a state in which the force applied from either of outside or inside in the car width direction can be counteracted in inflation and extension. Therefore, the movement of the occupant P1 (P2) to the vehicle center side at a side collision of the vehicle can be effectively regulated.

Figure 9:
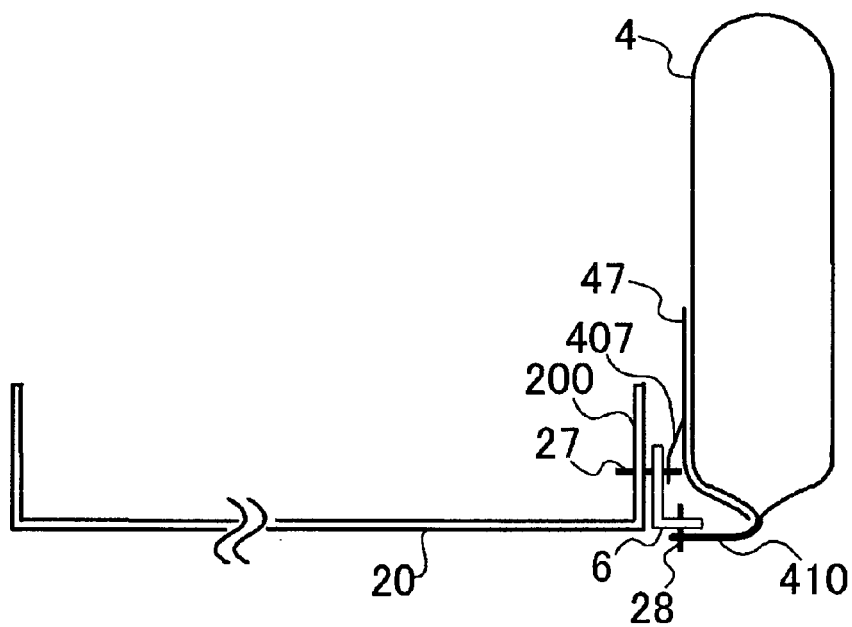
FIG. 9 is a plan view illustrating a variation of a second embodiment.

FIG. 9 is a plan view of an essential part illustrating an inflated and extended state of the central airbag 4 according to a variation of this embodiment. As shown in FIG. 9, on the outer face on the side opposing the seat frame side face 200 of the central airbag 4, a plurality of (two, for example) strip-shaped tethers 47 are disposed. On the tethers 47, ..., lug portions 407 whose one parts are sewn into a lug shape are provided. The shape of the tether 47 may be a band. Also, the number of tethers 47 disposed may be one.

On the seat frame side face 200, a plurality of (two, for example) bolts 27, ... are fixed in the vertical direction. Through the bolts 27, ..., a retainer 6 in the L-shape on a plan view is fixed to the seat frame 20.

The lug portions 407, ... are connected to the bolts 27, ... inserted through a face of the retainer 6 opposing the side face on the vehicle center side of the seat frame 20. Also, a tab 410 of the central airbag 4 is connected to a plurality of (two, for example) bolts 28, ... inserted through a face of the retainer 6 in a direction crossing the side face on the vehicle center side of the seat frame 20 substantially at a right angle.

In this example, if a force is applied to the central airbag 4 from inside in the car width direction, a connection point (first connection point) between the lug portion 407 and the bolts 27, . . . becomes a fulcrum, and the base end side of the central airbag 4 is rotated to the inside in the car width direction. However, the rotation is prevented by a connecting force at a connection point (second connection point) between the tab 410 and the bolts 28, . . . .

On the other hand, if a force is applied from outside in the car width direction, the second connection point becomes the fulcrum, and the distal end side of the central airbag 4 is rotated to the inside in the car width direction. However, the rotation is prevented by the connecting force at the first connection point.

In this way, in the airbag device of this example, too, the central airbag 4 can be brought into a state in which the force applied from either of outside or inside in the car width direction can be counteracted in inflation and extension.

The first and second embodiments of the present invention have been explained. However, the present invention is not limited to either of the above embodiments.

For example, in each of the above embodiments, the central airbag 4 is housed in a passenger seat (seat 1B), but not limited to that. For example, the central airbag 4 may be housed in a driver seat (seat 1A). Also, the central airbag 4 may be housed in both seats, for example.

Figure 10A:
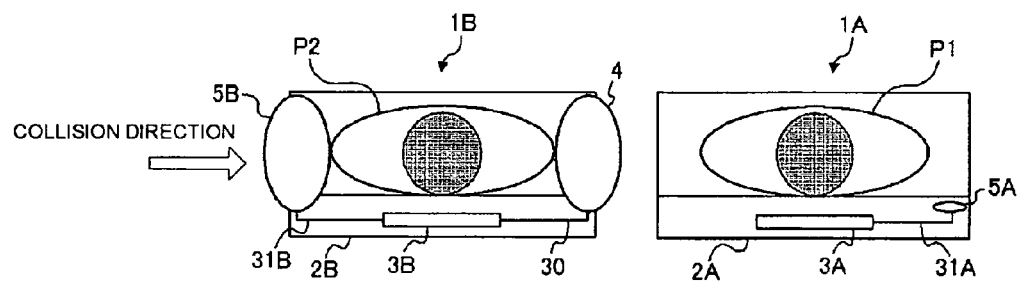
FIG. 10A is a plan view illustrating a state in which an airbag is inflated and extended in an airbag device according to another embodiment of the present invention and showing a state at a side collision on a passenger seat direction side.
Figure 10B:
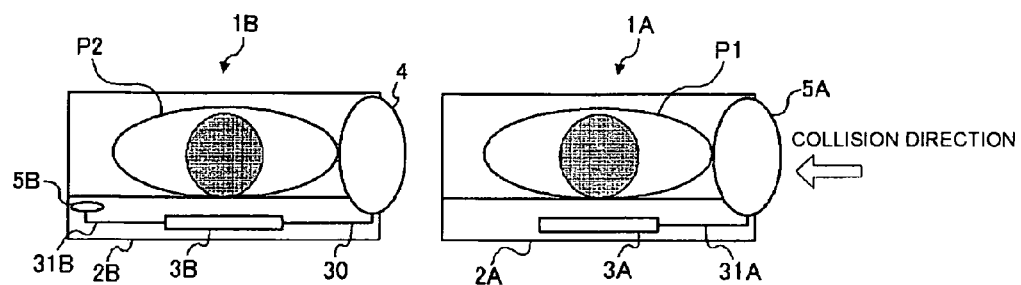
FIG. 10B is a plan view illustrating a state in which an airbag is inflated and extended in an airbag device according to another embodiment of the present invention and showing a state at a side collision on a driver seat direction side.

Also, at a vehicle side collision, as shown in FIG. 1, instead of inflation and extension of all the airbags (the central airbag 4, the door-side airbags 5A and 5B), it may be so configured that only one of the door-side airbags 5A and 5B corresponding to the collision side is inflated and extended as shown in FIGS. 10A and 10B.

The present application is based on Japanese Patent Application No. 2007-154327 filed on Jun. 11, 2007 and incorporates the specification, claims, drawings and abstract thereof. Disclosure in the above Japanese Patent Application is incorporated in its entirety in the specification by reference.

INDUSTRIAL APPLICABILITY

The airbag device of the present invention is useful as an airbag device to be installed in a seat of a vehicle. Particularly, it is useful as a side airbag device to be installed in a side of a seat of a vehicle.

The invention claimed is:

1. An airbag device comprising:
   a side-collision detecting means for detecting a side collision of a vehicle;
   a central airbag housed in an inner portion in a car width direction of at least one of two adjacent seats in the vehicle;
   a seat frame for the seat;
   a connecting member connecting the airbag to a side face of the seat frame, said connecting member being fixed to the airbag at a connection point so that the airbag has a base end side with respect to the connection point in a front-back direction of an inflated airbag;
   a tether provided along an outer face of the inflated airbag located at a side opposite to the seat, said tether extending from the connecting member to a distal end portion of the inflated airbag; and
   an inflator housed in the seat retaining said central airbag and supplying a gas into said central airbag at a side collision of the vehicle,
   wherein said tether has a length shorter than a length along the outer surface of the inflated airbag from the connection point to the distal end portion so that said central airbag counteracts a force from inside in the car width direction by a tension due to the length of said tether and counteracts a force from outside in the car width direction by a force received from a side face of the base end side of said seat frame during inflation and extension.

2. The airbag device according to claim 1, further comprising
   a plate to be brought into planar contact with a base-end side curved face of said central airbag between said seat frame and said central airbag when receiving a force from the outside in the car width direction.

3. The airbag device according to claim 2, wherein
   a pressure sensor is provided on said plate at a position of the planar contact with the base-end side curved face of said central airbag so that said pressure sensor detects a pressure received from said central airbag; and
   plate control means for displacing said plate according to a pressure detected by said pressure sensor is further provided.

4. The airbag device according to claim 3, wherein
   said plate is installed between said seat frame and said tether;
   said plate, said seat frame and said tether are connected through the connecting member; and
   said plate control means rotates said plate around said connecting member according to the pressure detected by said pressure sensor.

5. The airbag device according to claim 1, further comprising
   a door-side airbag which is housed in a side face portion on a vehicle door side of each of said two seats and is inflated and expanded at a side collision of the vehicle.

6. The airbag device according to claim 1, further comprising another tether provided on an outer face of the inflated airbag at a side of the seat, and having a lug portion connected to the connecting member.

* * * * *